United States Patent
Yuan et al.

(10) Patent No.: US 8,429,454 B2
(45) Date of Patent: Apr. 23, 2013

(54) COORDINATION OF ERROR REPORTING AMONG MULTIPLE MANAGED RUNTIMES IN THE SAME PROCESS

(75) Inventors: Hsu-chieh Yuan, Bellevue, WA (US); Richard M. Byers, Bellevue, WA (US); Thomas Lai, Bellevue, WA (US); Jon Langdon, Issaquah, WA (US); Kumar Gaurav Khanna, Redmond, WA (US); Vipul D. Patel, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 797 days.

(21) Appl. No.: 12/639,943

(22) Filed: Dec. 16, 2009

(65) Prior Publication Data

US 2011/0145662 A1    Jun. 16, 2011

(51) Int. Cl.
    *G06F 11/00* (2006.01)
(52) U.S. Cl.
    USPC ............ 714/25; 709/224; 709/225; 717/128
(58) Field of Classification Search ............... 714/25; 709/224, 225; 717/128
    See application file for complete search history.

(56) References Cited

U.S. PATENT DOCUMENTS

| | | | |
|---|---|---|---|
| 6,594,774 B1 * | 7/2003 | Chapman et al. | 714/2 |
| 6,912,670 B2 | 6/2005 | Wilkie | |
| 6,922,796 B1 * | 7/2005 | Matena et al. | 714/48 |
| 7,165,097 B1 | 1/2007 | Mackin et al. | |
| 7,257,743 B2 | 8/2007 | Glerum et al. | |
| 7,363,615 B2 | 4/2008 | Krishnaswamy et al. | |
| 7,861,120 B2 * | 12/2010 | Cui | 714/38.1 |
| 2003/0028684 A1 * | 2/2003 | Segev et al. | 709/328 |
| 2004/0060048 A1 * | 3/2004 | Abelite et al. | 718/1 |
| 2004/0107414 A1 * | 6/2004 | Bronicki et al. | 717/105 |
| 2004/0237064 A1 * | 11/2004 | Liu et al. | 717/101 |
| 2007/0101324 A1 | 5/2007 | Lupu et al. | |
| 2007/0288912 A1 * | 12/2007 | Zimmer et al. | 717/148 |
| 2008/0010564 A1 * | 1/2008 | Chrysanthakopoulos et al. | 714/57 |
| 2009/0013208 A1 | 1/2009 | DiMuzio | |
| 2009/0089764 A1 * | 4/2009 | Lai et al. | 717/143 |
| 2010/0192132 A1 * | 7/2010 | Yuan et al. | 717/128 |
| 2010/0262814 A1 * | 10/2010 | Pardoe et al. | 712/244 |

OTHER PUBLICATIONS

Ha, et al., "Improved Error Reporting for Software that Uses Black-Box Components", Retrieved at <<http://www.cs.utexas.edu/~indrajit/pubs/clarify-pldi07.pdf>> ACM SIGPLAN, Jun. 11-13, 2007, vol. 42, No. 6, pp. 101-111.

Oiaga, Marius, "Windows 7 Windows Error Reporting Infrastructure", Retrieved at <<http://news.softpedia.com/news/Windows-7-Windows-Error-Reporting-Infrastructure-103252.shtml>> Jan. 29, 2009, pp. 2.

"Error Reporting Overview", Retrieved at <<http://msdn.microsoft.com/en-us/library/aa935778.aspx>> Aug. 27, 2008, p. 1.

(Continued)

*Primary Examiner* — Loan L. T. Truong

(57) ABSTRACT

Systems and methods are described for coordinating error reporting among a plurality of managed runtimes that are concurrently executing in the same process. In accordance with various embodiments, an error reporting manager that executes concurrently in the same process as the managed runtimes coordinates error reporting among the managed runtimes in a manner that does not require the managed runtimes to be aware of each other or to communicate directly with each other.

20 Claims, 6 Drawing Sheets

OTHER PUBLICATIONS

"Registering Error, Warning, and Notice Callback Routines", Retrieved at <<http://www.monen.nl/DevDoc/documentation/QuickTime/QD3D/qd3derrormgr.6.htm>> Sep. 14, 2009, pp. 2.

U.S. Appl. No. 12/358,708, "System and Method for Customized Error Reporting," filed Jan. 23, 2009.

* cited by examiner

COORDINATION OF ERROR REPORTING AMONG MULTIPLE MANAGED RUNTIMES IN THE SAME PROCESS

BACKGROUND

As used herein, the term native application refers to an application that is designed to run natively (i.e., without translators or other intermediary mechanisms) on an operating system executing on a processor-based computer system. In contrast, a managed application refers to an application that is not capable of running natively on the operating system, but is instead designed to run in an environment provided by a managed runtime executing on top of the operating system. The managed runtime manages the execution of the managed application and provides services thereto. Among other features, the managed runtime may provide a just-in-time compiler that converts the code of a managed application into code native to the operating system at runtime. By using managed runtimes, applications that have been compiled for a single architecture can be run on many different machines. Examples of managed runtimes include the Common Language Runtime published by Microsoft Corporation of Redmond, Wash., and the Java Runtime Environment published by Sun Microsystems of Santa Clara, Calif.

When the execution of a managed application is initiated on a processor-based computer system, the operating system is prompted to load the appropriate managed runtime to facilitate execution of the managed application. In certain computing environments, it is now possible to concurrently run more than one managed runtime in a single process. This feature enables a native or managed application to invoke the features of one or more additional managed applications, wherein each managed application is supported by its own managed runtime. One advantage of the ability to concurrently run multiple managed runtimes in a single process is that managed applications written for different versions of the same managed runtime can be concurrently executed within the same process without concerns about compatibility. For example, managed applications written for different versions of the Common Language Runtime may be executed concurrently within the same process by loading the appropriate version of the Common Language Runtime to support each managed application.

Certain challenges arise when attempting to operate a computing environment in which more than one managed runtime can run concurrently in the same process. For example, when two or more managed runtimes are running concurrently in the same process and one of the managed runtimes fails unexpectedly, each managed runtime may independently attempt to report an application error even when the managed runtime did not itself cause the failure. This results in the generation of multiple error reports, with only one of the reports coming from the failing managed runtime, which has the context of the original failure to be used to generate a useful error report. The generation of multiple error reports in this manner provides a poor user experience. Furthermore, the generation of multiple error reports in this manner could mislead subsequent investigations into the cause of the failure since only the error report generated by the failing managed runtime is useful for investigation.

In order to provide a reasonable error reporting user experience, it would appear that some sort of cooperation is required between the different managed runtimes running in the same process. For example, let it be assumed that a failure occurs due to an unhandled exception thrown by a first managed runtime executing on a thread and that a second managed runtime owns the base of the thread. In this case, only the first managed runtime will have the information necessary to produce a useful error report. However, due to the way exceptions are managed in some computing environments, only the second managed runtime may have the information necessary to determine whether the exception is fatal and that an error report should be triggered. Since the first and second managed runtimes are designed to be unaware of each other and do not communicate directly, the result may be that only the second managed runtime produces an error report, but the error report is not useful. Other possible results due to this lack of cooperation between the managed runtimes is that no error reports are generated or that multiple error reports are generated, but at best only one of the error reports is useful.

Commonly-owned co-pending U.S. patent application Ser. No. 12/358,708, filed on Jan. 23, 2009, describes a customized error reporting system that can be used to coordinate error reporting among multiple managed runtimes concurrently running in the same process. However, the error reporting facilities described in this application are provided as part of an operating system. As such, the approach to coordinating error reporting described in that application will only work in a system in which the operating system has been built or modified to include the described facilities. Otherwise, the concurrent execution of multiple runtimes in the same process will lead to the various problems described above.

What is needed then is a system and method for coordinating error reporting among multiple runtimes that are concurrently executing in the same process. The desired system and method should address one or more of the problems described above, including but not limited to the generation of error reports that are not useful and/or the generation of multiple error reports by the managed runtimes. The desired system and method should also address the problem(s) in a manner that is not dependent on facilities built or added into a particular operating system.

SUMMARY

Systems and methods are described herein for coordinating error reporting among a plurality of managed runtimes that are concurrently executing in the same process. In accordance with various embodiments, an error reporting manager that executes concurrently in the same process as the managed runtimes coordinates error reporting among the managed runtimes in a manner that does not require the managed runtimes to be aware of each other or to communicate directly with each other. By performing such coordination, the error reporting manager operates to ensure that if the process crashes, at most one error report will be generated by the managed runtime that caused the failure or the first managed runtime that encounters an error that does not come from any of the managed runtimes in the process. By performing such coordination, the error reporting manager also operates to ensure that the managed runtime that caused the failure will claim the error and will generate the error reporting information. Because the error reporting manager performs this coordination in-process, it provides an approach to managing error reporting among multiple managed runtimes concurrently running in the same process in a manner that is not dependent on facilities built or added into a particular operating system. Thus, this approach to managing error reporting can conceivably be implemented on different systems running different versions of the same operating system, or different operating systems entirely.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles of the invention and to enable a person skilled in the relevant art(s) to make and use the invention.

Figure 3A:
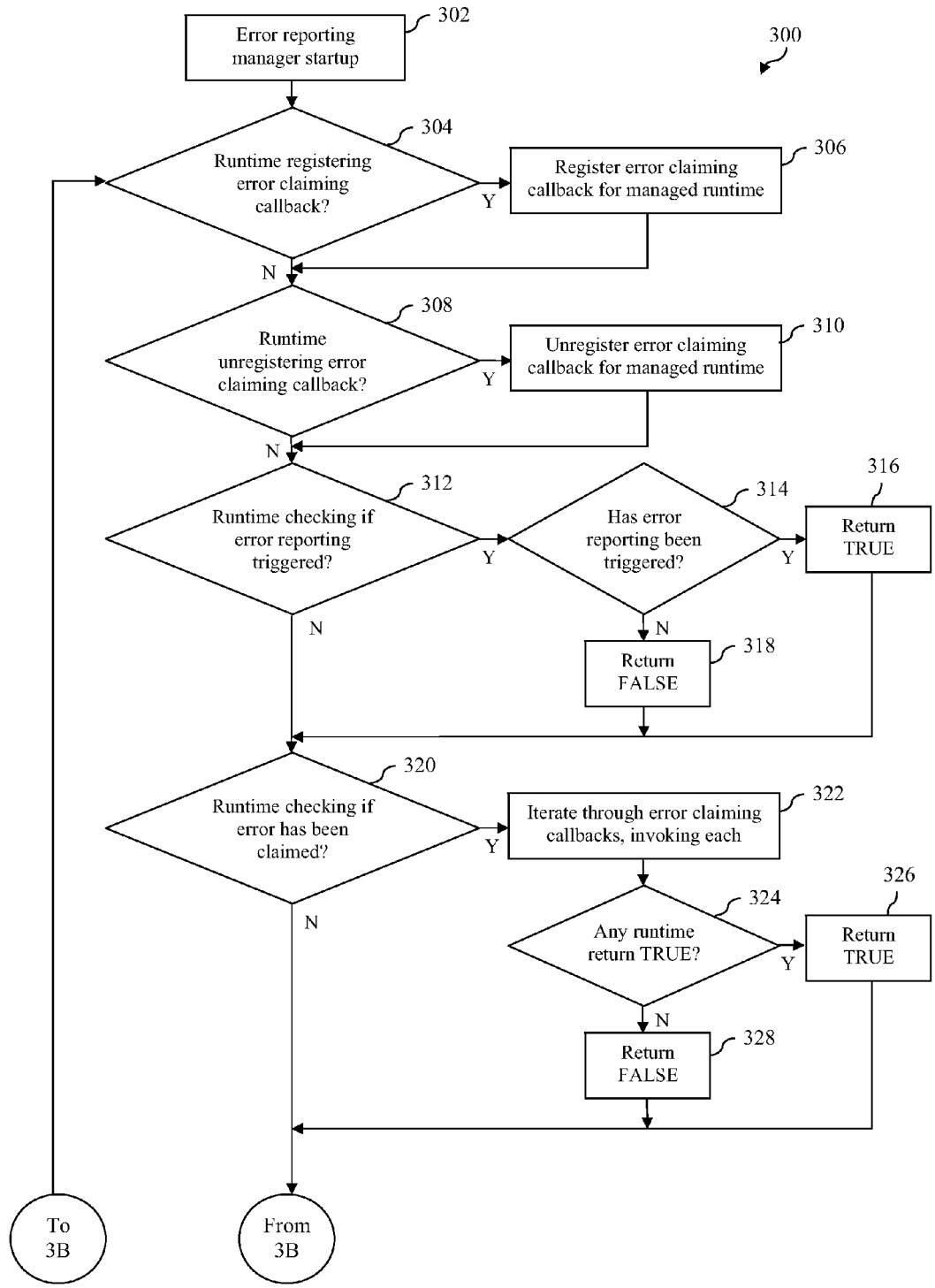
Figure 3B:
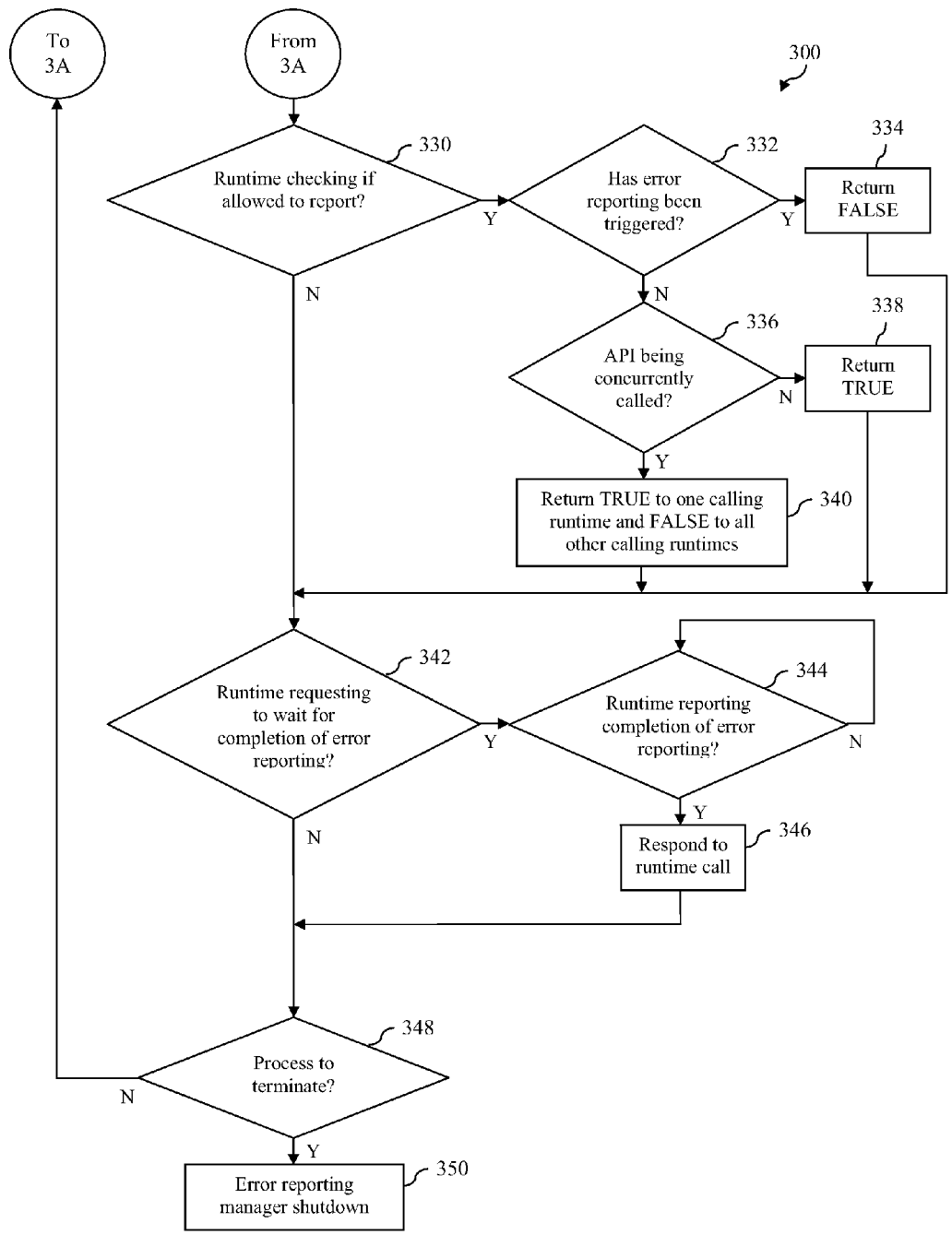

FIGS. 3A and 3B collectively depict a flowchart of a method by which an error reporting manager operates to coordinate error reporting among multiple managed runtimes concurrently running in the same process in accordance with an example embodiment.

Figure 4:
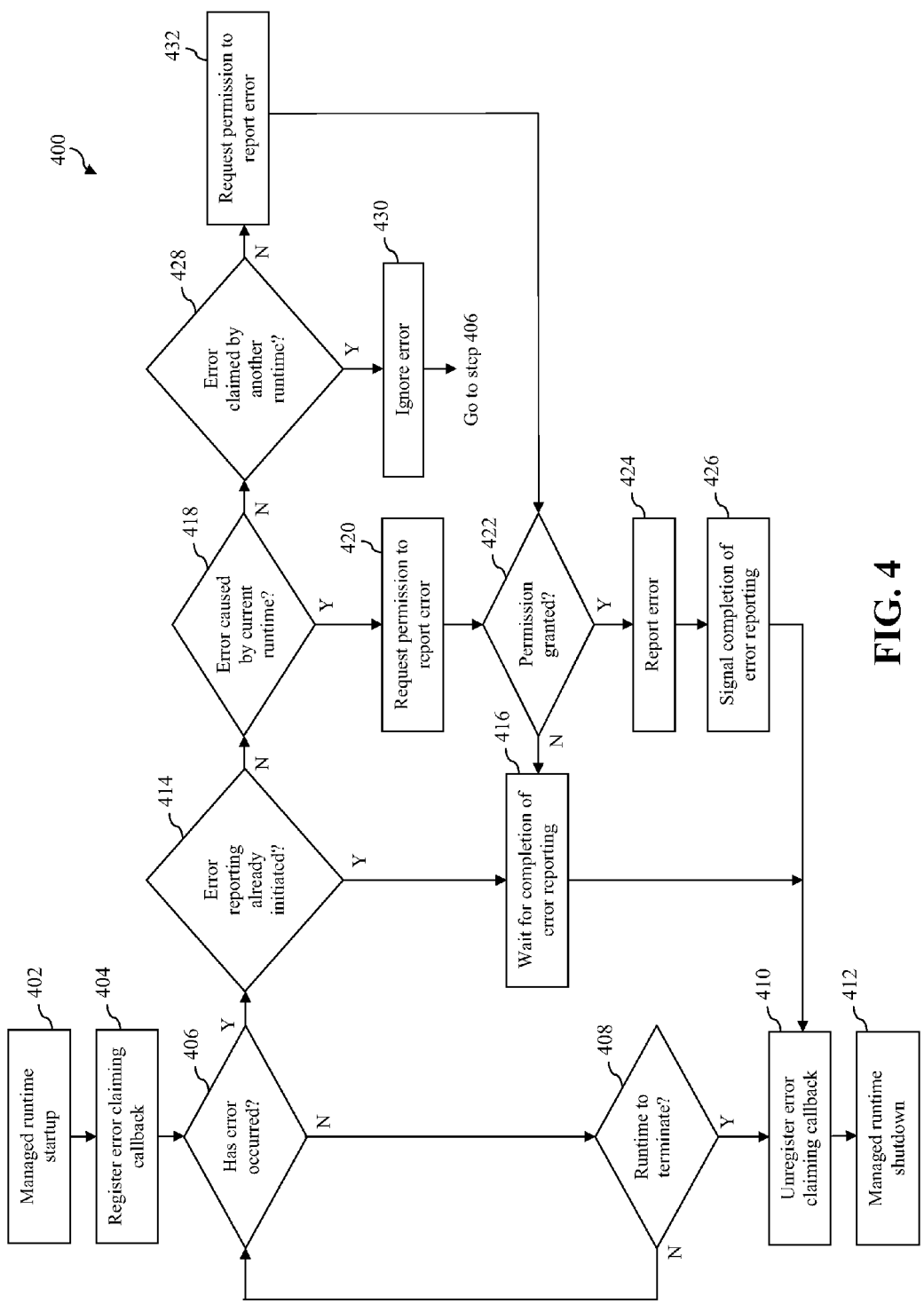

FIG. 4 depicts a flowchart of a method by which a managed runtime operates to facilitate coordinated error reporting by multiple managed runtimes concurrently running in the same process in accordance with an example embodiment.

Figure 5:
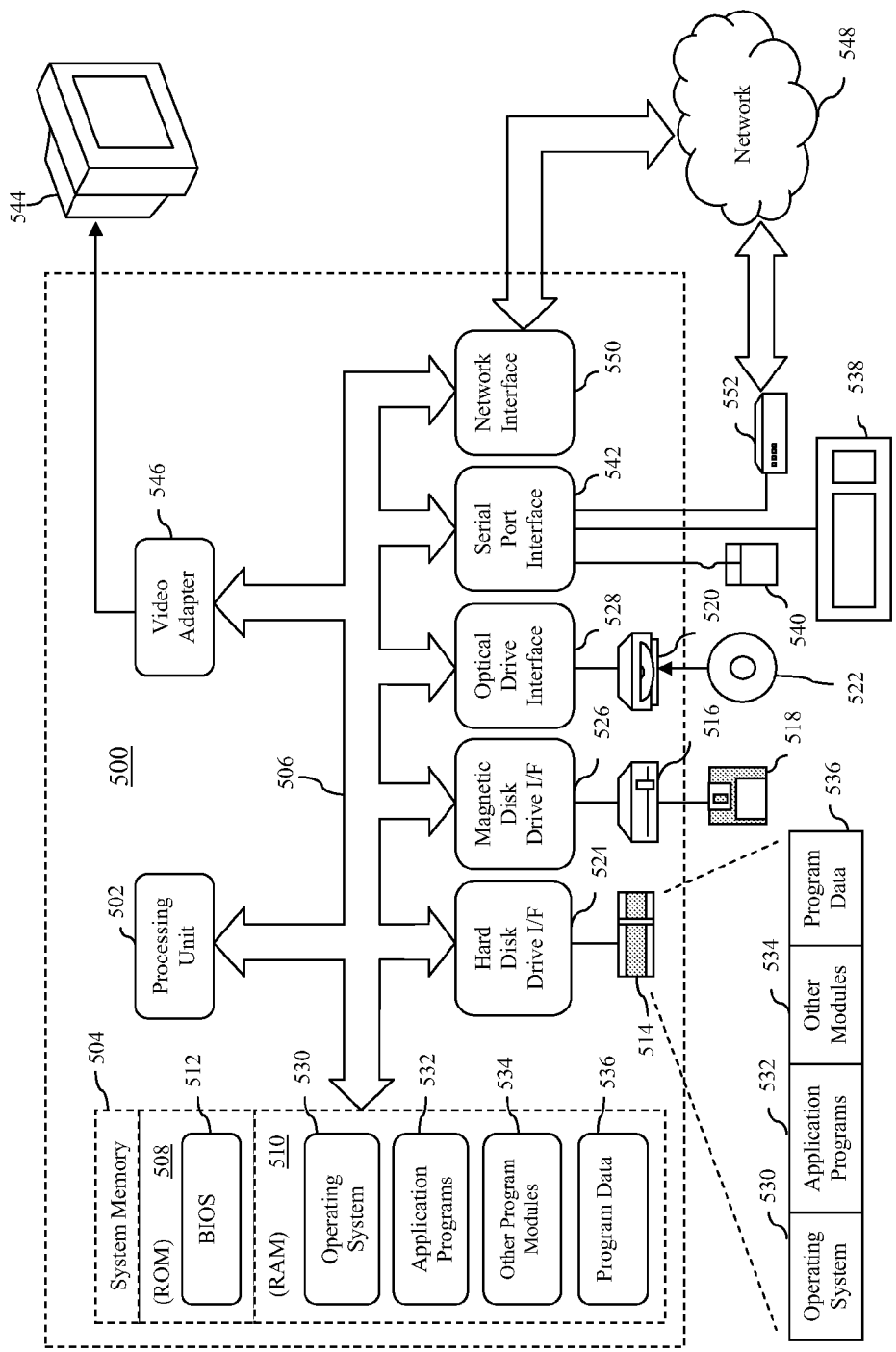

FIG. 5 depicts an example user machine that may be used to implement various aspects of the embodiments.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Figure 1:
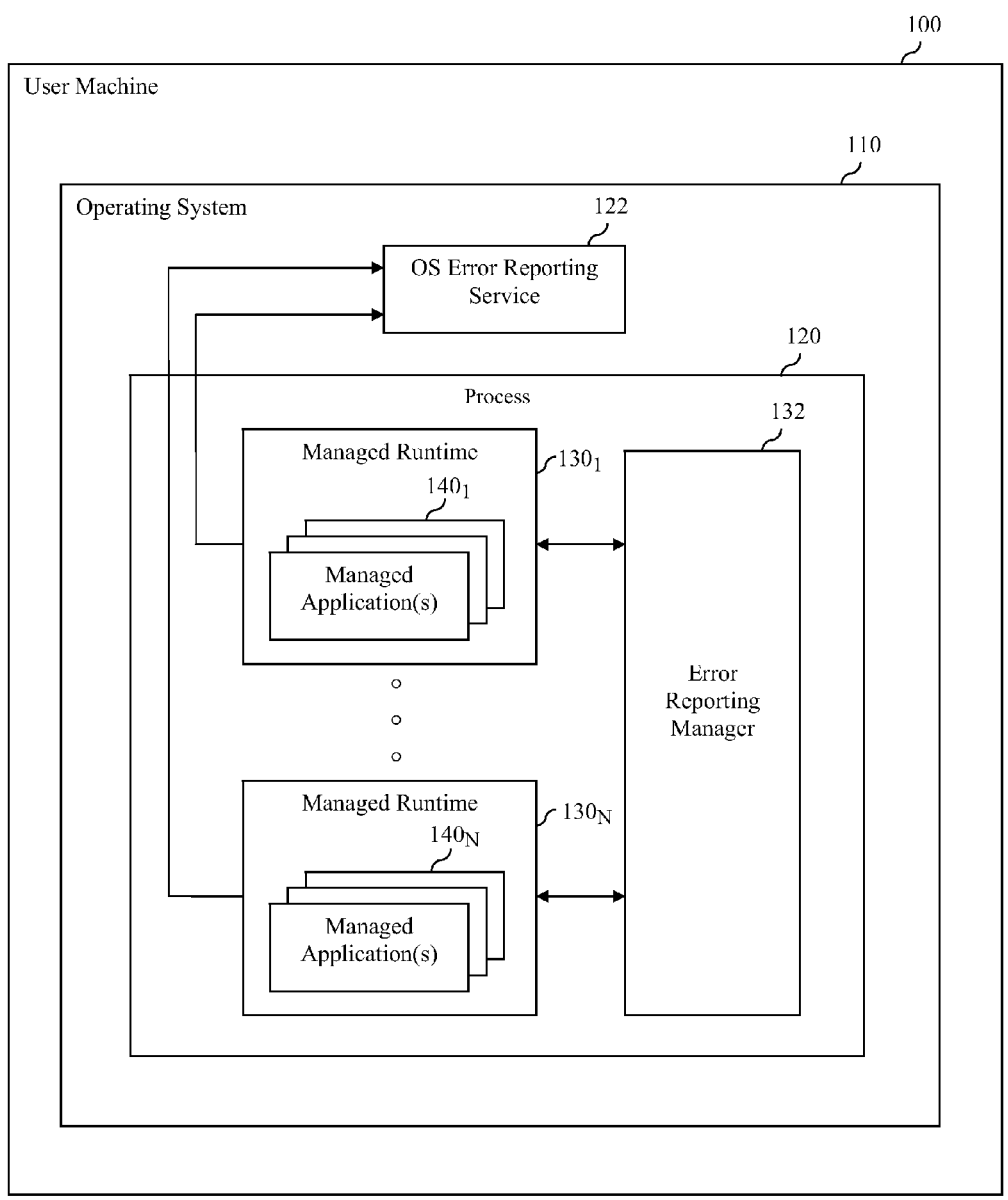
FIG. 1 is a block diagram of a system that coordinates error reporting among multiple managed runtimes concurrently running in the same process in accordance with an example embodiment.

II. Example Systems and Methods for Coordinating Error Reporting Among Multiple Managed Runtimes Concurrently Running in the Same Process FIG. 1 is a block diagram of a system that coordinates error reporting among multiple managed runtimes concurrently running in the same process in accordance with one example embodiment. As shown in FIG. 1, the system is implemented on a user machine 100, which is intended to broadly represent any processor-based computer system or platform upon which software may be executed for the benefit or a user. For example and without limitation, user machine 100 may comprise a desktop computer, a laptop computer, a tablet computer, a video game console, a personal digital assistant, a smart phone, or a portable media player. A specific example of a user machine upon which the system of FIG. 1 may be implemented will be described subsequently herein in reference to FIG. 5.

As shown in FIG. 1, an operating system 110 is installed on user machine 110 and is executed thereon. Operating system 110 acts as a host for software applications running on user machine 110. For example, operating system 110 manages and coordinates the sharing of the resources of user machine 110 by various applications running thereon. Operating system 110 also interfaces with various hardware elements of user machine 110 on behalf of applications, thereby relieving the applications from having to manage details of hardware operations and making the applications easier to write. Operating system 110 may offer a number of services to applications and users. Applications access these services through application programming interfaces (APIs) or system calls. By invoking these interfaces, an application can request a service from operating system 110, pass parameters thereto, and receive results therefrom. Depending upon the implementation, users may interact with operating system 110 via a software user interface (SUI) such as a command line interface (CLI) or a graphical user interface (GUI). For handheld and desktop computers, the user interface is generally considered part of operating system 110. On larger multi-user systems, the user interface is generally implemented as an application program that runs on top of operating system 110.

In one embodiment, operating system 110 comprises a WINDOWS® XP, WINDOWS® VISTA® or WINDOWS® 7 operating system published by Microsoft Corporation of Redmond, Wash. However, this example is not intended to be limiting, and operating system 110 may comprise any conventional or subsequently-developed operating system that is designed to perform at least one or more of the aforementioned functions.

As shown in FIG. 1, a process 120 is running on top of operating system 110. A process includes an instance of computer code, such as an application, that is being executed by user machine 100. To accommodate the fact that some applications are programmed to call or invoke other applications, a single process may include multiple concurrently-executing applications. Applications may be native or managed. A native application is an application that is designed to run natively (i.e., without translators or other intermediary mechanisms) on an operating system while a managed application refers to an application that is not capable of running natively on the operating system, but is instead designed to run in an environment provided by a managed runtime executing on top of the operating system. When the execution of a managed application is initiated on a processor-based computer system, the operating system is prompted to load the appropriate managed runtime to facilitate execution of the managed application.

In certain computing environments, it is possible to concurrently run more than one managed runtime in a single process. The system of FIG. 1 represents an example of such a computing environment. As shown in that figure, process 120 includes multiple concurrently-executing managed runtimes $130_1$ through $130_N$. Each of the managed runtimes has been loaded by operating system 110 to support the execution of one or more managed applications in process 120. For example, managed runtime $130_1$ has been loaded to support the execution of one or more managed applications $140_1$ and managed runtime $130_N$ has been loaded to support the execution of one or more managed applications $140_N$. In one embodiment, each managed runtime comprises a version of the Common Language Runtime published by Microsoft Corporation of Redmond, Wash. However, this is only one example, and the managed runtimes may include other managed runtimes including but not limited to the Java Runtime Environment published by Sun Microsystems of Santa Clara, Calif., the ADOBE® FLASH® Player published by Adobe Systems of San Jose, Calif., a Ruby programming language runtime environment, a Python programming language environment, or the like.

One advantage of the ability to concurrently run multiple managed runtimes in a single process is that managed applications written for different versions of the same managed runtime can be concurrently executed within the same process without concerns about compatibility. For example, managed applications written for different versions of the Common Language Runtime may be executed concurrently within the same process by loading the appropriate version of the Common Language Runtime to support each managed application.

As further shown in FIG. 1, operating system includes an error reporting service 122. Among other features, error reporting service 122 collects data about native and managed applications running on operating system 110 that experience failures. Such information may be stored locally on user machine 100 and/or transmitted to a remote server (not shown in FIG. 1) that aggregates such information so that patterns that reveal the source of failures can be identified. The transmission of the information to the remote server may be carried out, for example, over a local area network or wide area network, such as the Internet. In certain embodiments, the error reporting information stored locally on user machine 100, or a subset of such information, may be viewed by a user of user machine 100 via a GUI provided by operating system 110.

Depending upon the implementation, when error reporting service 122 becomes aware of a failed application, it may cause a dialog box to be presented to a user via a GUI provided by operating system 110 that asks the user if an error report should be transmitted to a remote server and/or if the user wishes to debug the failed application.

Each of managed runtimes $130_1$-$130_N$ includes logic for reporting error information on behalf of a failing managed application to error reporting service 122. A managed runtime may trigger error reporting, for example, when it determines that a managed application has thrown an unhandled exception. An unhandled exception indicates a problem with an application. Certain problems, such as invalid input, are anticipated by application developers and handlers for certain exceptions may be provided within an application. But, when an exception is not handled by the application, the application is no longer in an operational state (e.g., it has "crashed"). A managed runtime may also trigger error reporting, for example, if a managed application fails to respond for a period of time. This condition is sometimes referred to an "application hang." An application hang may be caused by a number of conditions, such as encountering an infinite loop in the application code, a deadlock condition, or resource starvation. An application may request the managed runtime that executes the application to trigger error reporting when it detects a logic error, a security risk or corrupted state.

As described in the Background Section above, certain challenges arise when attempting to operate a computing environment in which more than one managed runtime can run concurrently in the same process and each is capable of independently reporting an application error. As described in that section, this may result in the generation of no error reports for a failure, or the generation of multiple error reports where at best only one of the error reports is useful. To address this issue, user machine 100 includes an in-process component denoted error reporting manager 132 that coordinates error reporting among managed runtimes $130_1$-$130_N$ in a manner that does not require the managed runtimes to be aware of each other or to communicate directly with each other. By performing such coordination, error reporting manager 132 operates to ensure that if process 120 crashes, at most one error report will be generated by the managed runtime that caused the failure or the first managed runtime that encounters an error that does not come from any of managed runtimes in the process. By performing such coordination, error reporting manager 132 also operates to ensure that the managed runtime that caused the failure will claim the error and will generate the error reporting information if there is no other concurrent and different error being processed in the process. If there are two or more concurrent and different errors being processed in the process, the first managed runtime that is ready to report an error will report an error.

Because error reporting manager 132 performs this coordination in-process, it provides an approach to managing error reporting among multiple managed runtimes concurrently running in the same process in a manner that is not dependent on facilities built or added into a particular operating system. Thus, this approach to managing error reporting can conceivably be implemented on different systems running different versions of the same operating system, or different operating systems entirely.

Figure 2:
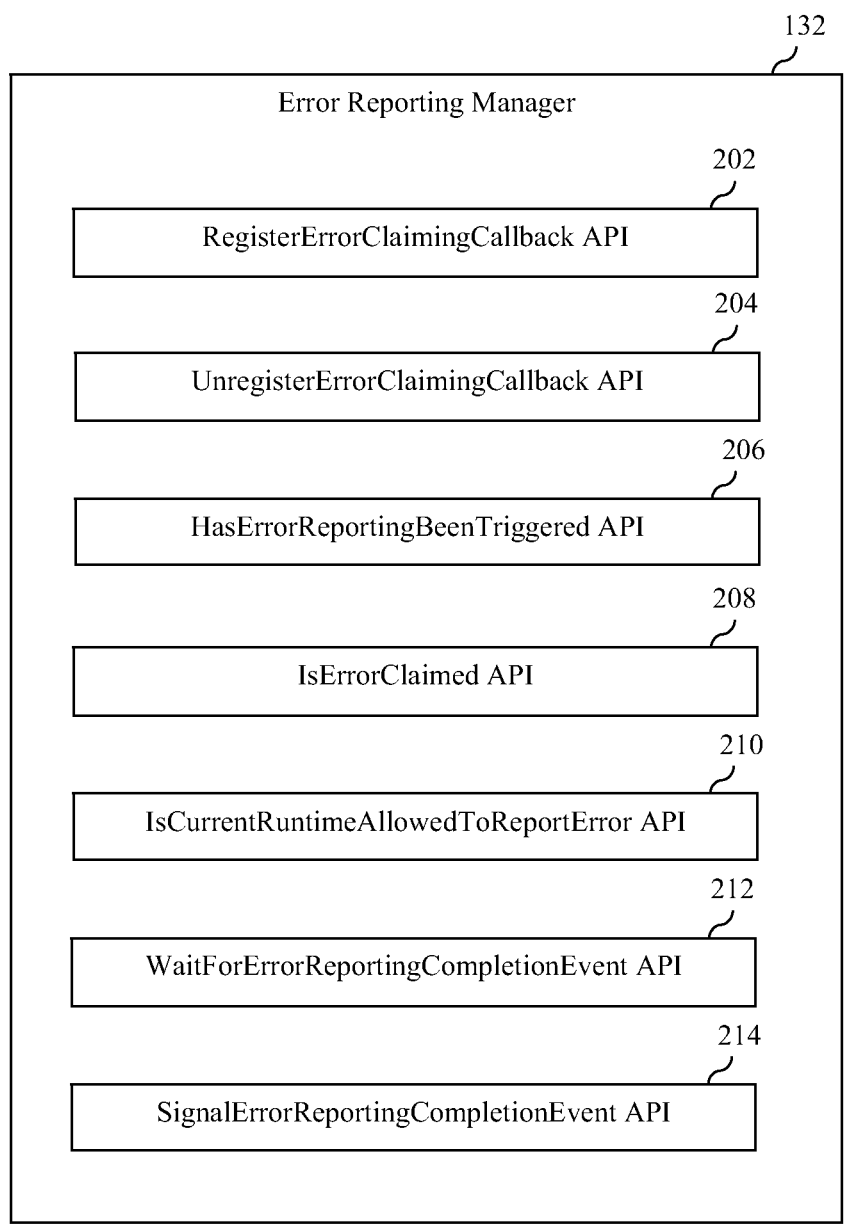
FIG. 2 is a block diagram of error reporting manager in accordance with an example embodiment.

FIG. 2 is a block diagram of error reporting manager 132 in accordance with one embodiment. As shown in FIG. 2, error reporting manager 132 includes a plurality of APIs by which each managed runtime that is running concurrently in a process along with error reporting manager 132 can communicate with error reporting manager 132. These APIs include a RegisterErrorClaimingCallback API 202, an UnregisterErrorClaimingCallback API 204, a HasErrorReportingBeenTriggered API 206, an IsErrorClaimed API 208, an IsCurrentRuntimeAllowedtoReportError API 210, a WaitForErrorReportingCompletionEvent API 212, and a SignalErrorReportingCompletionEvent API 214. A brief description of each of these APIs will now be provided.

RegisterErrorClaimingCallback API 202 may be invoked by a managed runtime to register an error claiming callback with error reporting manager 132. In an embodiment, each managed runtime in a process will invoke RegisterErrorClaimingCallback API 202 to register an error claiming callback with error reporting manager 132 during startup of the managed runtime.

UnregisterErrorClaimingCallback API 204 may be invoked by a managed runtime to unregister an error claiming callback that was previously registered with error reporting manager 132. In an embodiment, each managed runtime in a process will invoke UnregisterErrorClaimingCallback API 204 during shutdown of the managed runtime to unregister an error claiming callback that was previously registered with error reporting manager 132.

HasErrorReportingBeenTriggered API 206 may be invoked by a managed runtime to determine whether error reporting has already been initiated for the process in which the managed runtime is running In one embodiment, responsive to the invocation of HasErrorReportingBeenTriggered API 206 by a managed runtime, error reporting manager 132 will return TRUE to the managed runtime if error reporting has already been initiated for the process and will return FALSE to the managed runtime if error reporting has not already been initiated for the process.

IsErrorClaimed API 208 may be invoked by a managed runtime to determine if an error that has been encountered by the managed runtime has been claimed by any other managed runtime concurrently running in the same process. In one embodiment, in response to invocation of this API by a managed runtime, error reporting manager 132 will iterate through all registered exception claiming callbacks, invoking a callback to each registered managed runtime. In response to the callback, each registered managed application will either return TRUE if it claims the error or FALSE if it does not claim the error. If any managed application returns TRUE, then error reporting manager will return TRUE to the managed runtime that invoked IsErrorClaimed API 208. However, if no managed application returns TRUE, then error reporting manager 132 will return FALSE to the managed runtime that invoked IsErrorClaimed API 208.

IsCurrentRuntimeAllowedToReportError API 210 may be invoked by a managed runtime to determine if the managed runtime is permitted to initiate the reporting of information about an error encountered and/or claimed by the managed runtime. In an embodiment, in response to the invocation of IsCurrentRuntimeAllowedToReportError API 210 by a managed runtime, error reporting manager 132 will return FALSE to the managed runtime if error reporting has already been initiated for the process. If error reporting has not yet been initiated for the process, but two or more managed runtimes have concurrently called IsCurrentRuntimeAllowedtoReportError API 210, then error reporting manager 132 will return TRUE to one of the calling managed runtimes and return FALSE to all of the other calling managed runtimes. If error reporting has not yet been initiated for the process, and only one managed runtime has called IsCurrentRuntimeAllowedtoReportError API 210, then error reporting manager 132 will return TRUE to the calling managed runtime.

WaitForErrorReportingCompletionEvent API 212 may be invoked by a managed runtime to cause the managed runtime to suspend execution while waiting for the completion of error reporting for the process. In an embodiment, a managed runtime will invoke WaitForErrorReportingCompletionEvent API 212 in response to calling HasErrorReportingBeenTriggered API 206 and receiving TRUE from error reporting manager 132 or in response to calling IsCurrentRuntimeAllowedToReportError API 210 and receiving FALSE from error reporting manager 132. The suspension of execution of the managed runtime ensures that the managed runtime cannot initiate shutdown of the process in which it is running prior to the completion of error reporting. Error reporting manager 132 will only respond to this call when it has determined that error reporting has been completed for the process.

SignalErrorReportingCompletionEvent API 214 may be invoked by a managed runtime that has been allowed to perform error reporting when it has completed the error reporting process. In an embodiment, error reporting manager 132 will respond to all pending calls to WaitForErrorReportingCompletionEvent API 212 only after SignalErrorReportingCompletionEvent API 214 is invoked by a managed runtime.

The foregoing APIs have been provided by way of example only. Persons skilled in the relevant art(s) will appreciate that other APIs may be provided to facilitate communication between managed runtimes $130_1$-$130_N$ and error reporting manager 132. Furthermore, in other embodiment, means other than APIs may be used to enable communication between managed runtimes $130_1$-$130_N$ and error reporting manager 132.

The manner in which error reporting manager 132 and managed runtimes $130_1$-$130_N$ operate and interact to coordinate error reporting among the managed runtimes will now be further described. In particular, FIGS. 3A and 3B collectively depict a flowchart 300 of a method by which error reporting manager 132 may operate to coordinate error reporting between managed runtimes $130_1$-$130_N$ concurrently executing in process 120. Although the method of flowchart 300 is described herein in reference to components of example system 100, persons skilled in the relevant art(s) will readily appreciate that the method is not limited to that implementation and may be implemented by other systems or other components.

The steps of flowchart 300 are shown as being executed sequentially for ease of explanation only. It is to be understood that various steps shown in flowchart 300 may be executed concurrently. For example, in an embodiment in which user machine 100 comprises multiple processors or multiple processing cores, two or more steps of flowchart 300 may be concurrently executed by corresponding processors or processing cores.

As shown in FIG. 3A, the method of flowchart 300 begins at step 302 in which startup of error reporting manager 132 occurs. In an embodiment, startup of error reporting manager 132 occurs automatically when the first managed runtime to execute within process 120 is loaded by operating system 110. After step 302, control then flows to decision step 304.

At decision step 304, error reporting manager 132 determines if a managed runtime running within process 120 is attempting to register an error claiming callback. In one embodiment, a managed runtime running within process 120 attempts to register an error claiming callback by calling RegisterErrorClaimingCallback API 202 and including a pointer back to the managed runtime as an argument to the API call. However, this is only an example, and other methods may be used to attempt to register an error claiming callback with error reporting manager 132.

If error reporting manager 132 determines at decision step 304 that no managed runtime running within process 120 is attempting to register an error claiming callback, then control flows to decision step 308. However, if error reporting manager 132 determines at decision step 304 that a managed runtime running within process 120 is attempting to register an error claiming callback, then error reporting manager 132 will register the error claiming callback as shown at step 306. In one embodiment, registering the error claiming callback comprises storing a pointer provided as an argument to RegisterErrorClaimingCallback API 202 in a table or other data structure managed by error reporting manager 132. However, this is only an example, and other methods may be used to register an error claiming callback provided by a managed runtime. After step 306, control then flows to decision step 308.

At decision step 308, error reporting manager 132 determines if a managed runtime running within process 120 is attempting to unregister a previously-registered error claiming callback. In one embodiment, a managed runtime running within process 120 attempts to unregister a previously-registered error claiming callback by calling UnregisterErrorClaimingCallback API 204. However, this is only an example, and other methods may be used to attempt to unregister an error claiming callback that was previously registered with error reporting manager 132.

If error reporting manager 132 determines at decision step 308 that no managed runtime running within process 120 is attempting to unregister a previously-registered error claiming callback, then control flows to decision step 312. However, if error reporting manager 132 determines at decision step 308 that a managed runtime running within process 120 is attempting to unregister a previously-registered error claiming callback, then error reporting manager 132 will unregister the previously-registered error claiming callback as shown at step 310. In one embodiment, unregistering the error claiming callback comprises removing a pointer to the managed runtime from a table or other data structure managed by error reporting manager 132. However, this is only an example, and other methods may be used to unregister a previously-registered error claiming callback. After step 310, control then flows to decision step 312.

At decision step 312, error reporting manager 132 determines if a managed runtime running within process 120 is attempting to determine whether or not error reporting has already been triggered for process 120. In one embodiment, a managed runtime attempts to determine whether or not error reporting has already been triggered for process 120 by calling HasErrorReportingBeenTriggered API 206. However, this is only an example, and other methods may be used to attempt to determine whether or not error reporting has already been triggered for process 120.

If error reporting manager 132 determines at decision step 312 that no managed runtime running within process 120 is attempting to determine whether or not error reporting has already been triggered for process 120, then control flows to decision step 320. However, if error reporting manager 132 determines at decision step 312 that a managed runtime running within process 120 is attempting to determine whether or not error reporting has already been triggered for process 120, then control flows to decision step 314.

At decision step 314, error reporting manager 132 determines whether or not error reporting has already been triggered for process 120. If error reporting manager 132 determines that error reporting has already been triggered for process 120, then error reporting manager 132 returns an indicator to that effect (e.g., "TRUE") to the managed runtime attempting to retrieve such information as shown at step 316. If error reporting manager 132 determines at decision step 314 that error reporting has not already been triggered for process 120, then error reporting manager 132 returns an indicator to that effect (e.g., "FALSE") to the managed runtime attempting to retrieve such information as shown at step 318. After the performance of step 316 or step 318, control then flows to decision step 320.

At decision step 320, error reporting manager 132 determines if a managed runtime running within process 120 is attempting to determine whether an error has been claimed by any other managed runtime running within process 120. In one embodiment, a managed runtime attempts to determine whether an error has been claimed by any other managed runtime running within process 120 by calling IsErrorClaimed API 208. However, this is only an example, and other methods may be used to attempt to determine whether an error has been claimed by any other managed runtime running within process 120.

If error reporting manager 132 determines at decision step 320 that no managed runtime running within process 120 is attempting to determine whether an error has been claimed by any other managed runtime running within process 120, then control flows to decision step 330 (shown in FIG. 3B). However, if error reporting manager 132 determines at decision step 320 that a managed runtime running within process 120 is attempting to determine whether an error has been claimed by any other managed runtime running within process 120, then control flows to step 322.

At step 322, error reporting manager 132 iterates through all registered error claiming callbacks, invoking the callback corresponding to each registered managed runtime. In response to the callback, each registered managed runtime will either return an indicator that indicates that the managed runtime claims ownership of the error (e.g., "TRUE") or an indicator that indicates that the managed runtime does not claim ownership of the error (e.g., "FALSE"). Control then flows to decision step 324. Note that in an embodiment in which different steps of flowchart 300 may be performed concurrently, when step 322 is being performed by error reporting manager 132, the performance of steps 306 and 310 dealing with registering and unregistering error claiming callbacks will be blocked. Similarly, when step 306 or 310 is being performed, the performance of step 322 will be blocked.

At decision step 324, error reporting manager 132 determines whether any of the registered managed runtimes have returned an indicator that indicates that the error has been claimed (e.g., "TRUE"). If error reporting manager 132 determines that a registered managed runtime has returned an indicator that indicates that the error has been claimed, then error reporting manager 132 will return an indicator that indicates that the error has been claimed (e.g., "TRUE") to the managed runtime seeking such information as shown at step 326. However, if error reporting manager 132 determines that no registered managed runtime has returned an indicator that indicates that the error has been claimed, then error reporting manager 132 will return an indicator that indicates that the error has not been claimed (e.g., "FALSE") to the managed runtime seeking such information as shown at step 328. After the performance of step 326 or step 328, control then flows to decision step 330 (shown in FIG. 3B).

At decision step 330, error reporting manager 132 determines if a managed runtime running within process 120 is requesting permission to report an error. In an embodiment, a managed runtime requests permission to report an error by calling IsCurrentRuntimeAllowedToReportError API 210. However, this is only an example, and other methods may be used to attempt to determine whether an error has been claimed by any other managed runtime running within process 120.

If error reporting manager 132 determines at decision step 330 that no managed runtime running within process 120 is requesting permission to report an error, then control flows to decision step 342. However, if error reporting manager 132 determines at decision step 330 that a managed runtime running within process 120 is requesting permission to report an error, then control flows to decision step 332.

At decision step 332, error reporting manager 132 determines whether or not error reporting has already been triggered for process 120. If error reporting manager 132 determines that error reporting has already been triggered for process 120, then error reporting manager 132 returns an indicator (e.g., "FALSE") to the managed runtime requesting permission to report an error that indicates that the managed runtime is not permitted to report the error as shown at step 334. If error reporting manager 132 determines at decision step 332 that error reporting has not already been triggered for process 120, then control flows to decision step 336, in which error reporting manager 132 determines if other managed runtimes running within process 120 are concurrently requesting permission to report an error. In one embodiment, error reporting manager 132 performs this function by determining whether multiple concurrent calls to IsCurrentRuntimeAllowedToReportError API 210 have been received. However, this is only an example, and error reporting manager 132 may use other methods for determining whether multiple managed runtimes running within process 120 are concurrently requesting permission to report an error.

If error reporting manager 132 determines during decision step 336 that there are no concurrent error reporting requests, then error reporting manager 132 returns an indicator (e.g., "TRUE") to the managed runtime requesting permission to report an error that indicates that the managed runtime is permitted to report the error as shown at step 338. However, if error reporting manager 132 determines during decision step 336 that there are concurrent error reporting requests from different managed runtimes, then error reporting manager 132 will return an indicator (e.g., "TRUE") to only one of the managed runtimes requesting permission to report an error that indicates that the managed runtime is permitted to report the error and will return a different indicator (e.g., "FALSE") to all the other managed runtime(s) requesting permission to report an error that indicates that the other managed runtime(s) are not permitted to report the error as shown at step 340. This step ensures that even if different managed runtimes executing on different threads are requesting permission to report an error that only a single managed runtime will be permitted to report an error, and thus only a single error report will be produced for process 120.

Various methods may be used by error reporting manager 132 to determine which one of the multiple managed runtimes requesting permission to report an error will receive permission to report. Such a determination may be made in a logical or arbitrary fashion. For example, in one embodiment, error reporting manager 132 grants permission to the requesting managed runtime that first notified error reporting manager 132 of an error.

After completion of step 334, step 338 or step 340, control then flows to decision step 342.

At decision step 342, error reporting manager 132 determines if a managed runtime running within process 120 is requesting to wait for the completion of error reporting for process 120. In an embodiment, a managed runtime requests to wait for the completion of error reporting by calling WaitForErrorReportingCompletionEvent API 212. However, this is only an example, and other methods may be used by a managed runtime to request to wait for the completion of error reporting. A managed runtime may request to wait for completion of error reporting in response to being notified by error reporting manager 132 that error reporting has already been triggered for process 120 during step 316 or in response to being denied permission to perform error reporting during steps 334 or 340 as previously described.

If error reporting manager 132 determines at decision step 342 that no managed runtime running within process 120 is requesting to wait for the completion of error reporting for process 120, then control flows to decision step 348. However, if error reporting manager 132 determines at decision step 342 that a managed runtime running within process 120 is requesting to wait for the completion of error reporting for process 120, then control flows to decision step 344.

At decision step 344, error reporting manger 132 determines if a managed runtime running within process 120 has notified error reporting manager 132 that it has completed error reporting for process 120. In one embodiment, a managed runtime running within process 120 notifies error reporting manager 132 that it has completed error reporting for process 120 by calling SignalErrorReportingCompletionEvent API 214. However, this is only an example and other methods may be used by a managed runtime to notify error reporting manager 132 that it has completed error reporting for process 120.

If error reporting manager 132 determines during decision step 344 that no managed runtime running within process 120 has notified error reporting manager 132 that it has completed error reporting for process 120, then error reporting manager 132 will not respond to the call from the managed runtime requesting to wait for the completion of error reporting and will continue to check if another managed runtime has reported the completion of error reporting. The failure to respond to the call from the requesting managed runtime has the effect of suspending the execution of the requesting managed runtime, thereby ensuring that the requesting managed runtime cannot initiate termination of process 120 prior to the completion of error reporting. It is noted that this is only one example of a mechanism for suspending the execution of the requesting managed runtime and that other mechanisms may be used.

However, if error reporting manager 132 determines during decision step 344 that a managed runtime running within process 120 has notified error reporting manager 132 that it has completed error reporting for process 120, then error reporting manager 132 will respond to the call from the managed runtime requesting to wait for the completion of error reporting as shown at step 346. This will have the effect of causing the execution of the requesting managed runtime to resume, thereby allowing the requesting managed runtime to initialize a managed runtime termination procedure. It is noted that this is only one example of a mechanism for causing the execution of the requesting managed runtime to resume and that other mechanisms may be used. After step 346, control flows to decision step 348.

At decision 348, error reporting manager 132 determines if process 120 is about to terminate. If error reporting manager 132 determines that process 120 is not about to terminate, then control flows back to decision step 304 (shown in FIG. 3A). However, if error reporting manager 132 determines that process 120 is about to terminate, then error reporting manager 132 will shut down as shown at step 350.

The manner in which error reporting manager 132 and managed runtimes $130_1$-$130_N$ operate and interact to coordinate error reporting among the managed runtimes will now be further described in reference to flowchart 400 of FIG. 4. In particular, FIG. 4 depicts a flowchart 400 of steps taken by a managed runtime, such as any of managed runtimes $130_1$-$130_N$, to facilitate coordinated error reporting. The managed runtime discussed in FIG. 4 will be denoted managed runtime 130, although it may represent any one of managed runtimes $130_1$-$130_N$. Although the method of flowchart 400 is described herein in reference to components of example system 100, persons skilled in the relevant art(s) will readily appreciate that the method is not limited to that implementation and may be implemented by other systems or other components.

As shown in FIG. 4, the method of flowchart 400 begins at step 402 in which startup of managed runtime 130 occurs within process 120. In an embodiment, operating system 110 is prompted to initiate managed runtime 130 responsive to the execution of a managed application that requires managed runtime 130 to operate. After step 402, control then flows to step 404.

Note that, in one embodiment, error reporting manager 132 is initialized by the first instance of managed runtime 130 that is loaded within process 120 during startup of that managed runtime. This occurs before any managed runtime can interact with error reporting manager 132.

At step 404, responsive to the startup of managed runtime 130, managed runtime 130 registers an error claiming callback with error reporting manager 132. In one embodiment, managed runtime 130 registers the error claiming callback by calling RegisterErrorClaimingCallback API 202 and including a pointer back to managed runtime 130 as an argument to the API call. However, this is only an example, and other methods may be used by managed runtime 130 to register an error claiming callback with error reporting manager 132. After step 404, control then flows to decision step 406.

At decision step 406, managed runtime 130 determines whether an error has occurred. As will be appreciated by persons skilled in the relevant art(s), various mechanisms exist by which managed runtime 130 may encounter an error. For example, managed runtime 130 may own the base of a thread on which an unhandled exception is encountered and may be notified of the unhandled exception by exception management logic running on user machine 100 that has worked its way up the thread searching for an exception handler. Alternatively, operating system 110 may be notified of an unhandled exception and report the unhandled exception to a set of registered modules that includes managed runtime 130. These are only examples, and there may be other mechanisms or means by which managed runtime 130 may determine that an error has occurred. Furthermore, it is noted that the term "error" as used herein is not limited to unhandled exceptions, but is intended to broadly represent any condition that would require an unexpected or abnormal termination of a managed runtime or application.

If managed runtime 130 determines at decision step 406 that no error has occurred, then control flows to decision step 408. At decision step 408, managed runtime 130 determines if managed runtime 130 is about to terminate. Such termination may occur, for example, in response to the orderly shutdown of a managed application that relies on managed runtime 130 for execution or in response to an error that causes an unexpected or abnormal termination of managed runtime 130 and/or any managed application that managed runtime 130 was invoked to support.

If managed runtime 130 is not about to terminate, then control returns to decision step 406. However, if managed runtime 130 is about to terminate then control flows to step 410, in which managed runtime 130 unregisters its previously-registered error claiming callback with error reporting manager 132. In one embodiment, managed runtime 130 unregisters its previously-registered error claiming callback with error reporting manager 132 by calling UnregisterErrorClaimingCallback API 204. However, this is only an example, and other methods may be used by managed runtime 130 to unregister its previously-registered error claiming callback with error reporting manager 132. After step 410, control then flows to step 412, in which managed runtime 130 is shutdown.

Note that, in one embodiment, error reporting manager 132 will be shut down after the last instance of managed runtime 130 unregisters its error claiming callback.

If managed runtime 130 determines during decision step 406 that an error has occurred, then control flows to decision step 414. During decision step 414, managed runtime 130 communicates with error reporting manager 132 to determine if error reporting has already been initiated for process 120. Such error reporting may have been initiated, for example, by a different managed runtime executing on a different thread of execution. In one embodiment, managed runtime 130 communicates with error reporting manager 132 to determine if error reporting has already been initiated for process 120 by calling HasErrorReportingBeenTriggered API 206 and then, in response to calling the API, receiving an indicator from error reporting manager 132 that indicates either that error reporting has already been initiated (e.g., "TRUE") or that error reporting has not already been initiated (e.g., "FALSE"). However, this is only an example, and other methods may be used by managed runtime 130 to communicate with error reporting manager 132 to determine whether or not error reporting has already been initiated for process 120.

If managed runtime 130 determines during decision step 414 that error reporting has already been initiated for process 120, then control flows to step 416. During step 416, managed runtime 130 sends a request to error reporting manager 132 to wait for the completion of error reporting for process 120. In response to sending the request, error reporting manager 132 causes the execution of managed runtime 130 to be suspended until another managed runtime has notified error reporting manager 132 that error reporting is complete. This step ensures that managed runtime 130 cannot initiate termination of process 120 until error reporting has completed. In an embodiment, managed runtime 130 sends a request to error reporting manager 132 to wait for the completion of error reporting for process 120 by calling WaitForErrorReportingCompletionEvent API 212 and error reporting manager 132 causes the execution of managed runtime 130 to be suspended by not returning a response to the API call until another managed runtime has notified error reporting manager 132 that error reporting is complete (e.g. via a call to SignalErrorReportingCompletionEvent API 214). However, this is only an example, and other methods may be used by managed runtime 130 to send a request to error reporting manager 132 to wait for the completion of error reporting and by error reporting manager 132 to cause the execution of managed runtime 130 to be suspended until error reporting is complete.

After step 416, control flows to step 410, in which managed runtime 130 unregisters its previously-registered error claiming callback with error reporting manager 132, and then to step 412, in which managed runtime 130 is shutdown.

If managed runtime 130 determines during decision step 414 that error reporting has not already been initiated for process 120, then control flows to decision step 418. During decision step 418, managed runtime 130 determines whether it has caused the error. If managed runtime 130 determines during decision step 418 that it has caused the error, then control flows to step 420.

During step 420, managed runtime 130 sends a request for permission to report the error to error reporting manager 132. In one embodiment, managed runtime 130 sends a request for permission to report the error to error reporting manager 132 by calling IsCurrentRuntimeAllowedToReportError API 210. However, this is only an example, and other methods may be used by managed runtime 130 to send a request for permission to report the error to error reporting manager 132. After step 420, control flows to decision step 422.

During decision step 422, managed runtime 130 determines if the request for permission sent to error reporting manager 132 during step 420 has been granted. In one embodiment, managed runtime 130 determines that the request for permission has been granted if error reporting manager 132 returns an indicator indicating that permission has been granted (e.g., "TRUE") in response to calling IsCurrentRuntimeAllowedToReportError API 210 and determines that the request for permission has been denied if error reporting manager 132 returns an indicator indicating that permission has been denied (e.g., "FALSE) in response to calling IsCurrentRuntimeAllowedtoReportError API 210. However this is only an example and managed runtime 130 may use other methods to determine if the request for permission sent to error reporting manager 132 during step 420 has been granted.

In one embodiment, error reporting manager 132 will deny permission if error reporting has already been triggered for process 120. In further accordance with such an embodiment, if error reporting has not already been triggered for process 120, but two or more managed runtimes are concurrently requesting permission to report an error, then error reporting manager 132 will grant permission to only one of the calling managed runtimes and deny permission to all of the other calling managed runtimes. In still further accordance with such an embodiment, if error reporting has not already been triggered for process 120, but only one managed runtime is requesting permission to report an error, then error reporting manager 132 will grant permission to the calling managed runtime. This approach to granting/denying permission ensures that at most one error report will be generated for process 120.

If managed runtime 130 determines during decision step 422 that permission has not been granted to report the error, then control flows to step 416, in which managed runtime 130 waits for error reporting for process 120 to complete, then to step 410, in which managed runtime 130 unregisters its previously-registered error claiming callback with error reporting manager 132, and finally to step 412, in which managed runtime 130 is shutdown.

If managed runtime 130 determines during decision step 422 that permission has been granted to report the error then control flows to steep 424 in which managed runtime 130 reports the error. Reporting the error may comprise, for example, providing information about the error to error reporting service 122 in operating system 122. After step 424 is complete, managed runtime 130 signals error reporting manager 132 that error reporting is complete as shown at step 426. This enables error reporting manager 132 to cause any other managed runtimes within process 120 that are in a state of suspended execution pending the completion of error reporting for process 120 to resume execution. In one embodiment, managed runtime 130 signals error reporting manager 132 that error reporting is complete by calling SignalErrorReportingCompletionEvent API 214. However, this is only an example, and other methods may be used by managed runtime 130 to signal error reporting manager 132 that error reporting is complete.

After step 426, control flows to step 410, in which managed runtime 130 unregisters its previously-registered error claiming callback with error reporting manager 132, and then to step 412, in which managed runtime 130 is shutdown.

Returning now to decision step 418, if managed runtime 130 determines during that step that the error was not caused by itself, then control flows to decision step 428. During decision step 428, managed runtime 130 communicates with error reporting manager 132 to determine if any other managed runtime running within process 120 has claimed ownership of the error. In one embodiment, managed runtime 130 communicates with error reporting manager 132 to determine if any other managed runtime running with process 120 has claimed ownership of the error by calling IsErrorClaimedAPI 208. In response to the calling of this API by managed runtime 130, error reporting manager 132 will either return an indicator that indicates that another managed runtime has claimed ownership of the error (e.g., "TRUE") or an indicator that indicates that no other managed runtime has claimed ownership of the error ("FALSE"). However, this is only an example, and other methods may be used by managed runtime 130 to communicate with error reporting manager 132 to determine if any other managed runtime running within process 120 has claimed ownership of the error.

If managed runtime 130 determines during decision step 428 that the error has been claimed by another managed runtime running within process 120, then managed runtime 130 will ignore the error as shown at step 430, after which control returns to decision step 406. This allows error dispatching logic within operating system 110 to subsequently invoke the appropriate error-claiming managed runtime, which will then perform at least a portion of the protocol shown in flowchart 400 for facilitating coordinated error reporting. In an alternative embodiment, rather than ignoring the error in step 430, managed runtime 130 may directly invoke the appropriate error-claimed managed runtime, which will then perform at least a portion of the protocol shown in flowchart 400 for facilitating coordinated error reporting and then go to step 410 once error reporting is complete.

However, if managed runtime 130 determines during decision step 428 that the error has not been claimed by another managed runtime running within process 120, then managed runtime 130 will request permission to report the error as shown at step 432. Step 432 may be performed in a like fashion to step 420 as previously described.

After step 432, control then flows to decision step 422. As previously described, during decision step 422, managed runtime 130 determines if the request for permission sent to error reporting manager 132 has been granted.

As was previously described, if managed runtime 130 determines during decision step 422 that permission has not been granted to report the error, then control flows to step 416, in which managed runtime 130 waits for error reporting for process 120 to complete, then to step 410, in which managed runtime 130 unregisters its previously-registered error claiming callback with error reporting manager 132, and finally to step 412, in which managed runtime 130 is shutdown.

As also was previously described, if managed runtime 130 determines during decision step 422 that permission has been granted to report the error then control flows to step 424 in which managed runtime 130 reports the error. After step 424 is complete, managed runtime 130 signals error reporting manager 132 that error reporting is complete at step 426.

After step 426, control flows to step 410, in which managed runtime 130 unregisters its previously-registered error claiming callback with error reporting manager 132, and then to step 412, in which managed runtime 130 is shutdown.

Execution of the foregoing method of flowchart 300 as described above in reference to FIGS. 3A and 3B by error reporting manager 132 and the foregoing method of flowchart 400 as described above in reference to FIG. 4 by each managed runtime concurrently executing in process 120 will advantageously ensure that if process 120 crashes, at most one error report will be generated by the managed runtime that caused the failure or the first managed runtime that encounters an error that does not come from any of managed runtimes in the process. Execution of the foregoing methods by error reporting manager 132 and each managed runtime concurrently executing in process 120 will also advantageously ensure that the managed runtime that caused the failure will claim the error, and will generate the error reporting information if there is no other concurrent and different error being processed in the process. If there are two or more concurrent and different errors being processed in the process, the first managed runtime that is ready to report an error will report an error.

III. Example Computer System Implementation

FIG. 5 depicts an example computer 500 that may be used to implement various aspects of the embodiments. For example, user machine 100 shown in FIG. 1 may be implemented using computer 500, including one or more features of computer system 500 and/or alternative features. Computer 500 may represent a general-purpose computing device in the form of a conventional personal computer, a mobile computer, or a workstation, for example, or computer 500 may be a special purpose computing device. The description of computer 500 provided herein is provided for purposes of illustration, and is not intended to be limiting. Embodiments may be implemented in further types of computer systems, as would be known to persons skilled in the relevant art(s).

As shown in FIG. 5, computer 500 includes a processing unit 502, a system memory 504, and a bus 506 that couples various system components including system memory 504 to processing unit 502. Processing unit 502 may comprise one or more processors or processing cores. Bus 506 represents one or more of any of several types of bus structures, including a memory bus or memory controller, a peripheral bus, an accelerated graphics port, and a processor or local bus using any of a variety of bus architectures. System memory 504 includes read only memory (ROM) 508 and random access memory (RAM) 510. A basic input/output system 512 (BIOS) is stored in ROM 508.

Computer 500 also has one or more of the following drives: a hard disk drive 514 for reading from and writing to a hard disk, a magnetic disk drive 516 for reading from or writing to a removable magnetic disk 518, and an optical disk drive 520 for reading from or writing to a removable optical disk 522 such as a CD ROM, DVD ROM, or other optical media. Hard disk drive 514, magnetic disk drive 516, and optical disk drive 520 are connected to bus 506 by a hard disk drive interface 524, a magnetic disk drive interface 526, and an optical drive interface 528, respectively. The drives and their associated computer-readable media provide nonvolatile storage of computer-readable instructions, data structures, program modules and other data for the computer. Although a hard disk, a removable magnetic disk and a removable optical disk are described, other types of computer-readable media can be used to store data, such as flash memory cards, digital video disks, random access memories (RAMs), read only memories (ROM), and the like.

A number of program modules may be stored locally on the hard disk, magnetic disk, optical disk, ROM, RAM or FLASH, or remotely on network storage in a LAN or WAN such as the Internet. These programs include an operating system 530, one or more application programs 532, other program modules 534, and program data 536. Operating system 530 may represent operating system 110 shown in FIG. 1 and thus may include error reporting service 122. Application programs 532 or program modules 534 may include, for example, logic representative of managed runtimes $130_1$-$130_N$, managed applications $140_1$-$140_N$, and/or error reporting manager 132. Thus, when executed, these application programs 532 or program modules 534 can perform methods such as those described above in reference to flowchart 300 of FIGS. 3A and 3B or flowchart 400 of FIG. 4.

A user may enter commands and information into the computer 500 through input devices such as keyboard 538 and pointing device 540. Other input devices (not shown) may include a microphone, joystick, game controller, scanner, or the like. These and other input devices are often connected to the processing unit 502 through a serial port interface 542 that is coupled to bus 506, but may be connected by other interfaces, such as a parallel port, game port, or a universal serial bus (USB).

A monitor 544 or other type of display device is also connected to bus 506 via an interface, such as a video adapter 546. In addition to the monitor, computer 500 may include other peripheral output devices (not shown) such as speakers and printers.

Computer 500 is connected to a network 548 (e.g., a local area network or wide area network such as the Internet) through a network interface or adapter 550, a modem 552, or other means for establishing communications over the network. Modem 552, which may be internal or external, is connected to bus 506 via serial port interface 542.

As used herein, the terms "computer program medium" and "computer-readable medium" are used to generally refer to media such as the hard disk associated with hard disk drive 514, removable magnetic disk 518, removable optical disk 522, as well as other media such as flash memory cards, digital video disks, random access memories (RAMs), read only memories (ROM), and the like.

As noted above, computer programs and modules (including application programs 532 and other program modules 534) may be stored on the hard disk, magnetic disk, optical disk, ROM, or RAM. Such computer programs may also be received via network interface 550 or serial port interface 542. Such computer programs, when executed or loaded by an application, enable computer 500 to implement features of embodiments discussed herein. Accordingly, such computer programs represent controllers of the computer 500.

Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for facilitating coordinated error reporting by a first managed runtime that is concurrently running with a plurality of other managed runtimes in a process executing on a processor-based computer system, comprising:

determining that an error has occurred;
responsive to determining that the error has occurred, determining whether the error was caused by the first managed runtime;
responsive to determining that the error was caused by the first managed runtime, reporting the error.

2. The method of claim 1, wherein determining that an error has occurred comprises determining that an unhandled exception has occurred.

3. The method of claim 1, wherein reporting the error comprises providing information about the error to an error reporting service in an operating system executing on the processor-based computer system.

4. The method of claim 1, further comprising:
sending a request to the error reporting manager to be placed in a state of suspended execution responsive to receiving an indicator from the error reporting manager that indicates that the first runtime is not permitted to report the error.

5. The method of claim 1, wherein reporting the error comprises:
sending a request for permission to report the error to an error reporting manager running within the same process, and
reporting the error responsive to receiving an indicator from the error reporting manager that indicates that the first runtime is permitted to report the error.

6. The method of claim 1, further comprising:
responsive to determining that the error was not caused by the first runtime, communicating with an error reporting manager running within the same process to determine if any of the other managed runtimes has claimed ownership of the error;
responsive to determining that none of the other managed runtimes has claimed ownership of the error, sending a request for permission to report the unclaimed error to the error reporting manager; and
reporting the unclaimed error responsive to receiving an indicator from the error reporting manager that indicates that the first runtime is permitted to report the unclaimed error.

7. The method of claim 6, further comprising:
sending a request to the error reporting manager to be placed in a state of suspended execution responsive to receiving an indicator from the error reporting manager that indicates that the first runtime is not permitted to report the unclaimed error.

8. The method of claim 6, further comprising:
responsive to determining that one of the other managed runtimes has claimed ownership of the error, ignoring the error.

9. The method of claim 6, further comprising:
responsive to determining that one of the other managed runtimes has claimed ownership of the error, invoking the managed runtime that claimed ownership of the error to report the claimed error.

10. The method of claim 1, further comprising:
during startup of the first managed runtime, initializing an error reporting manager within the same process if the first managed runtime is the first instance of a managed runtime that supports the error reporting manager and registering an error-claiming callback with the error reporting manager that can be used by the error reporting manager to determine if the first managed runtime claims ownership of an error.

11. The method of claim 10, further comprising:
unregistering the error-claiming callback with the error reporting manager and shutting down the error reporting manager if the first managed runtime is the last instance of a managed runtime that supports the error reporting manager prior to shutdown of the first managed runtime.

12. A method for coordinating error reporting among a plurality of managed runtimes concurrently running in a process executing on a processor-based computer system by an error reporting manager executing in the same process, the method comprising:
receiving a request from a first managed runtime in the plurality of managed runtimes for permission to perform error reporting;
determining if error reporting has already been initiated by another managed runtime in the plurality of managed runtimes; and
responsive to determining that error reporting has already been initiated by another managed runtime in the plurality of managed runtimes, sending an indicator to the first managed runtime that indicates that the first managed runtime is not permitted to perform error reporting.

13. The method of claim 12, further comprising:
receiving a request from the first managed runtime to be placed in a state of suspended execution until error reporting has been completed by the other managed runtime; and
placing the first managed runtime in a state of suspended execution until error reporting has been completed by the other managed runtime responsive to receiving the request.

14. The method of claim 13, further comprising:
receiving a notification from the other managed runtime that the other managed runtime has completed performing error reporting; and
responsive to receiving the notification from the other managed runtime, causing the first managed runtime to resume execution.

15. The method of claim 12, further comprising:
responsive to determining that error reporting has not already been initiated by another managed runtime in the plurality of managed runtimes, determining if any other managed runtime in the plurality of managed runtimes is requesting permission to perform error reporting concurrently with the first managed runtime; and
responsive to determining that no other managed runtime in the plurality of managed runtimes is requesting permission to perform error reporting concurrently with the first managed runtime, sending an indicator to the first managed runtime that indicates that the first managed runtime is permitted to perform error reporting.

16. The method of claim 15, further comprising:
responsive to determining that one or more other managed runtimes in the plurality of managed runtimes is requesting permission to perform error reporting concurrently with the first managed runtime, sending an indicator to the first managed runtime that indicates that the first managed runtime is permitted to perform error reporting and sending an indicator to each of the one or more other managed runtimes indicating that each of the one or more other managed runtimes is not permitted to perform error reporting.

17. The method of claim 16, further comprising:
selecting the first managed runtime as the only managed runtime that is permitted to perform error reporting responsive to determining that the first managed runtime was the first of the managed runtimes requesting permission to perform error reporting that notified the error reporting manager of an error.

18. The method of claim 16, further comprising:
receiving a request from each of the one or more other managed runtimes to be placed in a state of suspended execution until the first managed runtime completes performing error reporting; and
placing each of the one or more other managed runtimes in a state of suspended execution until the first managed runtime completes performing error reporting responsive to receiving the requests.

19. The method of claim 18, further comprising:
receiving a notification from the first managed runtime that the first managed runtime has completed performing error reporting; and
responsive to receiving the notification, causing each of the one or more other managed runtimes to resume execution.

20. A method for coordinating error reporting among a plurality of managed runtimes concurrently running in a process executing on a processor-based computer system by an error reporting manager executing in the same process, the method comprising:
registering an error claiming callback received from each of the managed runtimes;
receiving a request from a first managed runtime in the plurality of managed runtimes to determine if an error encountered by the first managed runtime is claimed by any of the managed runtimes; and
responsive to receiving the request from the first managed runtime, invoking each of the registered error claiming callbacks to determine if any of the managed runtimes claims ownership of the error, and sending an indicator to the first managed runtime indicating whether any of the other managed runtimes has claimed ownership of the error;
wherein the first managed runtime is configured to ignore the error if the error is claimed by another managed runtime and is configured to attempt to report the error if the error is not claimed by another managed runtime.

* * * * *